(12) United States Patent
Wang et al.

(10) Patent No.: US 12,164,137 B2
(45) Date of Patent: Dec. 10, 2024

(54) LIGHT GUIDE PLATE, BACKLIGHT MODULE, AND DISPLAY DEVICE

(71) Applicants: Chongqing BOE Optoelectronics Technology Co., Ltd., Chongqing (CN); BOE Technology Group Co., Ltd., Beijing (CN)

(72) Inventors: Xinlei Wang, Beijing (CN); Yong Shu, Beijing (CN); Nan Wang, Beijing (CN); Qi Cao, Beijing (CN); Ming Wang, Beijing (CN)

(73) Assignees: Chongqing BOE Optoelectronics Technology Co., Ltd., Chongqing (CN); BOE Technology Group Co., Ltd., Beijing (CN)

( * ) Notice: Subject to any disclaimer, the term of this patent is extended or adjusted under 35 U.S.C. 154(b) by 240 days.

(21) Appl. No.: 17/311,827

(22) PCT Filed: Dec. 29, 2020

(86) PCT No.: PCT/CN2020/140590
§ 371 (c)(1),
(2) Date: Aug. 4, 2023

(87) PCT Pub. No.: WO2021/190035
PCT Pub. Date: Sep. 30, 2021

(65) Prior Publication Data
US 2023/0400621 A1  Dec. 14, 2023

(30) Foreign Application Priority Data

Mar. 23, 2020 (CN) ......................... 202020378211.X

(51) Int. Cl.
*G02B 6/00* (2006.01)
*F21V 8/00* (2006.01)

(52) U.S. Cl.
CPC ......... *G02B 6/0045* (2013.01); *G02B 6/0055* (2013.01); *G02B 6/0088* (2013.01)

(58) Field of Classification Search
CPC ... G02B 6/0445; G02B 6/0055; G02B 6/0088
See application file for complete search history.

(56) References Cited

U.S. PATENT DOCUMENTS

2013/0235611 A1* 9/2013 Franklin ................. G09F 13/04
362/616
2014/0240639 A1 8/2014 Jung
(Continued)

FOREIGN PATENT DOCUMENTS

| CN | 103574390 A | 2/2014 |
| CN | 103939790 A | 7/2014 |

(Continued)

OTHER PUBLICATIONS

PCT/CN2020/140590 International Search Report and Written Opinion.

*Primary Examiner* — Gerald J Sufleta, II
(74) *Attorney, Agent, or Firm* — IPro, PLLC

(57) ABSTRACT

The present disclosure provides a light guide plate, including a light-entering surface, a light-exiting surface adjacent to the light-entering surface, and a bottom surface arranged opposite to the light-exiting surface. The light guide plate includes a central region corresponding to an active display region of a display panel and a peripheral region corresponding a non-display region of the display panel in a first direction, the peripheral region includes a first peripheral region at a side adjacent to the light-entering surface, at least the first peripheral region of the peripheral region has a thickness smaller than the central region in a second direction, the first direction is a direction in which light is propagated inside the light guide plate, and the second (Continued)

direction is a direction in which the light exits the light guide plate. The present disclosure further provides a backlight module and a display device.

18 Claims, 5 Drawing Sheets

(56) References Cited

U.S. PATENT DOCUMENTS

2015/0117054 A1* 4/2015 Tai ..................... G02B 6/0088
                                                            362/609
2019/0235149 A1* 8/2019 Xu ...................... G02B 6/0046
2019/0302351 A1* 10/2019 Hayashi ................ G02B 6/002

FOREIGN PATENT DOCUMENTS

| CN | 204116762 U | 1/2015 |
| CN | 104566007 A | 4/2015 |
| CN | 106772760 A | 5/2017 |
| CN | 110826543 A | 2/2020 |
| CN | 211554581 U | 9/2020 |

* cited by examiner

LIGHT GUIDE PLATE, BACKLIGHT MODULE, AND DISPLAY DEVICE

CROSS-REFERENCE TO RELATED APPLICATION

The present application is the U.S. national phase of PCT Application No. PCT/CN2020/140590 filed on Dec. 29, 2020, which claims a priority of the Chinese patent application 202020378211.X filed on Mar. 23, 2020, which are incorporated herein by reference in their entirety.

TECHNICAL FIELD

The present disclosure relates to the manufacture of a display product, in particular to a light guide plate, a backlight module, and a display device.

BACKGROUND

Ultra-thin Liquid Crystal Display (LCD) Module (LCM) is a mainstream development trend. A height of a U-like cavity of a back plate is limited by a thickness of a Light Guide Plate (LGP), so the thickness of the LGP becomes a bottleneck of a thickness of an ultra-thin MDL. In addition, due to the thickness of the LGP, the use of a full-sealant design is limited in a part of machines.

SUMMARY

An object of the present disclosure is to provide a light guide plate, a backlight module and a display device, so as to solve the problem that a thickness of the display device is limited when the height of the U-like cavity of the back plate is limited by a thickness of the light guide plate.

In one aspect, the present disclosure provides in some embodiments a light guide plate, including a light-entering surface, a light-exiting surface adjacent to the light-entering surface, and a bottom surface arranged opposite to the light-exiting surface. The light guide plate includes a central region corresponding to an active display region of a display panel and a peripheral region corresponding a non-display region of the display panel in a first direction, the peripheral region includes a first peripheral region at a side adjacent to the light-entering surface, at least the first peripheral region of the peripheral region has a thickness smaller than the central region in a second direction, the first direction is a direction in which light is propagated inside the light guide plate, and the second direction is a direction in which the light exits the light guide plate.

In some possible embodiments of the present disclosure, the light-exiting surface includes a first light-exiting sub-surface arranged at the central region and a second light-exiting sub-surface arranged at the peripheral region, the second light-exiting sub-surface includes a third light-exiting sub-surface arranged at the first peripheral region, the bottom surface includes a first bottom sub-surface arranged at the central region and a second bottom sub-surface arranged at the peripheral region, and the second bottom sub-surface includes a third bottom sub-surface arranged at the first peripheral region. At least the third light-exiting sub-surface of the second light-exiting sub-surface is depressed inward to form a first concave, and/or at least the third bottom sub-surface of the second bottom sub-surface is depressed inward to form a second concave, so that at least the first peripheral region of the peripheral region has the thickness smaller than the central region in the second direction.

In some possible embodiments of the present disclosure, a step-like structure is formed between the first light-exiting sub-surface and the second light-exiting sub-surface forming the first concave; or a slope structure is formed at a joint between the first light-exiting sub-surface and the second light-exiting sub-surface forming the first concave; or a smooth transition member is formed at the joint between the first light-exiting sub-surface and the second light-exiting sub-surface forming the first concave.

In some possible embodiments of the present disclosure, a step-like structure is formed between the first bottom sub-surface and the second bottom sub-surface forming the second concave; or a slope structure is formed at a joint between the first bottom sub-surface and the second bottom sub-surface forming the second concave; or a smooth transition member is formed at the joint between the first bottom sub-surface and the second bottom sub-surface forming the second concave.

In another aspect, the present disclosure provides in some embodiments a backlight module including a back plate and the above-mentioned light guide plate. The back plate includes a U-like structure consisting of a first portion arranged at the bottom surface, a second portion surrounding the light guide plate, and a third portion arranged at the light-exiting surface of the light guide plate, and the U-like structure encloses the first peripheral region.

In some possible embodiments of the present disclosure, the light-exiting surface includes a first light-exiting sub-surface arranged at the central region and a second light-exiting sub-surface arranged at the peripheral region, the second light-exiting sub-surface includes a third light-exiting sub-surface, the bottom surface includes a first bottom sub-surface arranged at the central region and a second bottom sub-surface arranged at the peripheral region, the second bottom sub-surface includes a third bottom sub-surface arranged at the first peripheral region, at least the third light-exiting sub-surface of the second light-exiting sub-surface is depressed inward to form a first concave, and the third portion is received in the first concave.

In some possible embodiments of the present disclosure, the backlight module further includes a light bar, the light bar includes a Light-Emitting Diode (LED) lamp and a flexible circuit board, the LED lamp is arranged at a light-entering side of the light guide plate, and the flexible circuit board is arranged between the third portion and the third light-exiting sub-surface.

In some possible embodiments of the present disclosure, the backlight module further includes a reflector arranged at a side of the first bottom sub-surface away from the light-exiting surface, and the reflector is arranged at a same layer as the first portion.

In some possible embodiments of the present disclosure, the light-exiting surface includes a first light-exiting sub-surface arranged at the central region and a second light-exiting sub-surface arranged at the peripheral region, the second light-exiting sub-surface includes a third light-exiting sub-surface arranged at the first peripheral region, the bottom surface includes a first bottom sub-surface arranged at the central region and a second bottom sub-surface arranged at the peripheral region, the second bottom sub-surface includes a third bottom sub-surface arranged at the first peripheral region, and at least the third bottom sub-surface of the second bottom sub-surface is depressed inward to form a second concave. The backlight module further includes a light bar, the light bar includes an LED lamp and a flexible circuit board, the LED lamp is arranged at a light-entering side of the light guide plate, and the flexible circuit board is received in the second concave.

In some possible embodiments of the present disclosure, the light-exiting surface includes a first light-exiting sub-surface arranged at the central region and a second light-exiting sub-surface arranged at the peripheral region, the second light-exiting sub-surface includes a third light-exiting sub-surface arranged at the first peripheral region, the bottom surface includes a first bottom sub-surface arranged at the central region and a second bottom sub-surface arranged at the peripheral region, and the second bottom sub-surface includes a third bottom sub-surface arranged at the first peripheral region. The backlight module further includes a reflector arranged at a side of the first bottom sub-surface away from the light-exiting surface. At least the third bottom sub-surface of the second bottom sub-surface is depressed inward to form a second concave, the first portion is received in the second concave, and the reflector is arranged at a same layer as the first portion.

In some possible embodiments of the present disclosure, the reflector has a thickness smaller than the first portion in the second direction, the reflector includes a first surface adjacent to the light guide plate and a second surface away from the light guide plate, and the first portion includes a third surface adjacent to the light guide plate and a fourth surface away from the light guide plate. The second surface and the fourth surface are located in a same plane, the first surface is spaced apart from a first position at the light-exiting surface of the light guide plate by a first distance in the second direction, the third surface is spaced apart from the first position at the light-exiting surface of the light guide plate by a second distance in the second direction, and the first distance is greater than the second distance.

In some possible embodiments of the present disclosure, the light-exiting surface includes a first light-exiting sub-surface arranged at the central region and a second light-exiting sub-surface arranged at the peripheral region, the second light-exiting sub-surface includes a third light-exiting sub-surface arranged at the first peripheral region, the bottom surface includes a first bottom sub-surface arranged at the central region and a second bottom sub-surface arranged at the peripheral region, and the second bottom sub-surface includes a third bottom sub-surface arranged at the first peripheral region. At least the third light-exiting sub-surface of the second light-exiting sub-surface is depressed inward to form a first concave, at least the third bottom sub-surface of the second bottom sub-surface is depressed inward to form a second concave, and the third portion is received in the first concave.

In some possible embodiments of the present disclosure, the backlight module further includes a light bar, the light bar includes an LED lamp and a flexible circuit board, the LED lamp is arranged at a light-entering side of the light guide plate, and the flexible circuit board is received in the first concave or the second concave.

In some possible embodiments of the present disclosure, the backlight module further includes a reflector arranged at a side of the first bottom sub-surface away from the light-exiting surface, at least the third bottom sub-surface of the second bottom sub-surface is depressed inward to form a second concave, the first portion is received in the second concave, and the reflector is arranged at a same layer as the first portion.

In some possible embodiments of the present disclosure, the reflector has a thickness smaller than the first portion in the second direction, the reflector includes a first surface adjacent to the light guide plate and a second surface away from the light guide plate, and the first portion includes a third surface adjacent to the light guide plate and a fourth surface away from the light guide plate. The second surface and the fourth surface are located in a same plane, the first surface is spaced apart from a first position at the light-exiting surface of the light guide plate by a first distance in the second direction, the third surface is spaced apart from the first position at the light-exiting surface of the light guide plate by a second distance in the second direction, and the first distance is greater than the second distance.

In some possible embodiments of the present disclosure, a composite prism consisting of a diffusion film and a brightness enhancement film is arranged at the light-exiting surface of the light guide plate.

In yet another aspect, the present disclosure provides in some embodiments a display device including a display panel and the above-mentioned backlight module.

In some possible embodiments of the present disclosure, the display device further includes a sealant arranged between the display panel and the backlight module, and the sealant includes a first connection member arranged between the third portion of the back plate and the display panel, a second connection member arranged between the first portion of the back plate and the display panel, and a third connection member formed through extending a part of the second connection member to a side surface of the display panel.

The present disclosure has the following beneficial effect. A thickness of the peripheral region of the light guide plate may be reduced, so as to reduce a height of a U-like cavity of the back plate and break through a bottleneck of the ultra-thin display device, thereby to reduce a thickness of the display device.

DETAILED DESCRIPTION

Figure 1:
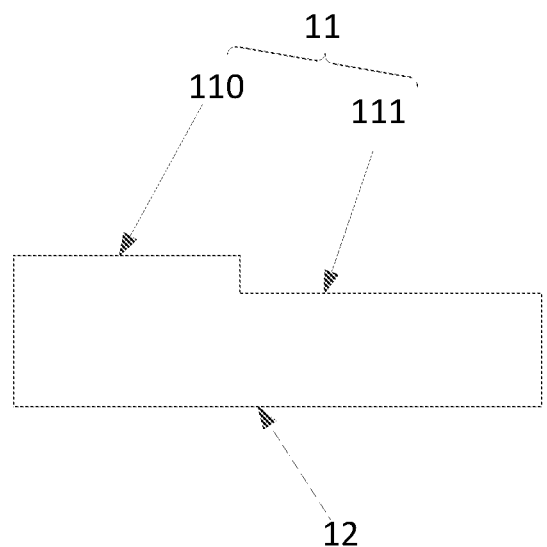
FIG. 1 is a first partial schematic view of a light guide plate according to one embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In the embodiments of the present disclosure, it should be appreciated that, such words as "in the middle of", "on/above", "under/below", "left", "right", "vertical", "horizontal", "inside" and "outside" may be used to indicate directions or positions as viewed in the drawings, and they are merely used to facilitate the description in the present disclosure, rather than to indicate or imply that a device or member must be arranged or operated at a specific position. In addition, such words as "first", "second" and "third" may be merely used to differentiate different components rather than to indicate or imply any importance.

Usually, a light guide plate has a uniform thickness in a first direction (a direction in which light is propagated inside the light guide plate), and a back plate encloses the light guide plate. A height of a U-like cavity of the back plate is limited by the thickness of the light guide plate, and the height cannot be further reduced, so it is impossible to reduce a thickness of a backlight module.

Figure 2:
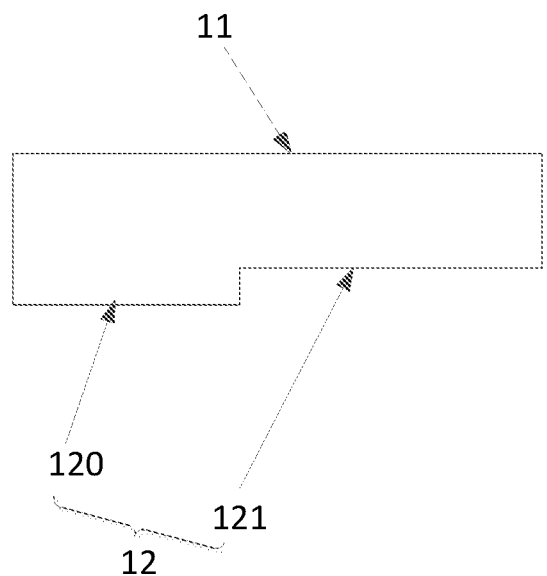
FIG. 2 is a second partial schematic view of the light guide plate according to one embodiment of the present disclosure.
Figure 3:
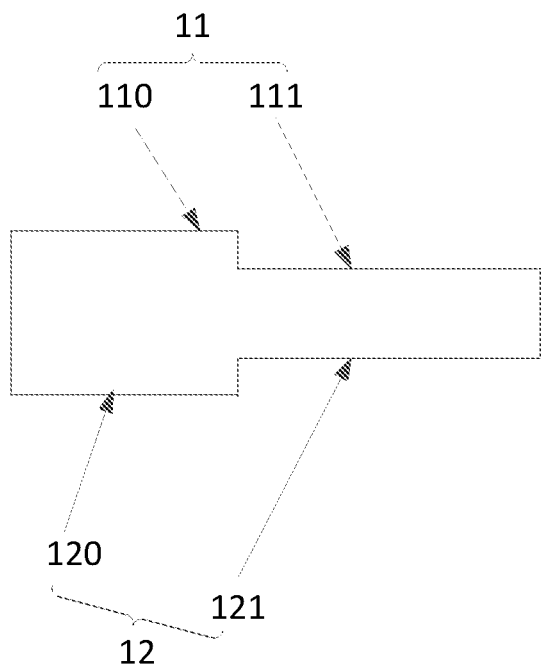
FIG. 3 is a third partial schematic view of the light guide plate according to one embodiment of the present disclosure.

In order to solve the above-mentioned technical problem, the present disclosure provides in some embodiments a light guide plate which, as shown in FIGS. 1 to 3, includes a light-entering surface, a light-exiting surface 11 adjacent to the light-entering surface, and a bottom surface 12 arranged opposite to the light-exiting surface 11. The light guide plate 1 includes a central region corresponding to an active display region of a display panel and a peripheral region corresponding a non-display region of the display panel in a first direction, the peripheral region includes a first peripheral region at a side adjacent to the light-entering surface, at least the first peripheral region of the peripheral region has a thickness smaller than the central region in a second direction, the first direction is a direction in which light is propagated inside the light guide plate 1, and the second direction is a direction in which the light exits the light guide plate 1.

A U-like structure of a back plate 2 may correspond to the first peripheral region, i.e., the U-like structure of the back plate 2 may enclose the first peripheral region of the light guide plate 1, so as to reduce a height of a U-like cavity of the back plate 2 and reduce a gap between a display panel and the back plate 2, thereby to reduce a thickness of an entire display module. Hence, the height of the U-like cavity of the back plate 2 may be reduced, as long as the thickness of the central region is greater than the thickness of the first peripheral region in the second direction i.e., the thickness of the first peripheral region of the light guide plate 1 is reduced. In this way, it is able to prevent a thickness of a backlight module from being limited by the light guide plate 1, thereby to reduce the thickness of the backlight module.

It should be appreciated that, in order to reduce the thickness of the entire display module, the thickness of the entire peripheral region, or a part of the peripheral region, may be reduced, which may be set according to the practical need in actual use, i.e., it is not limited to merely reduce the thickness of the first peripheral region.

It should be further appreciated that, the light guide plate 1 may be of a cylindrical or cuboidal shape, which will not be particularly defined herein.

In the embodiments of the present disclosure, the light-exiting surface 11 may include a first light-exiting sub-surface 110 arranged at the central region and a second light-exiting sub-surface 111 arranged at the peripheral region, and the second light-exiting sub-surface 111 may include a third light-exiting sub-surface arranged at the first peripheral region. The bottom surface 12 may include a first bottom sub-surface 120 arranged at the central region and a second bottom sub-surface 121 arranged at the peripheral region, and the second bottom sub-surface 121 may include a third bottom sub-surface arranged at the first peripheral region. At least the third light-exiting sub-surface of the second light-exiting sub-surface 111 may be depressed inward to form a first concave, and/or at least the third bottom sub-surface of the second bottom sub-surface 121 may be depressed inward to form a second concave, so that at least the central region has the thickness greater than the first peripheral region of the peripheral region in the second direction.

In order to reduce the thickness of the peripheral region of the light guide plate 1, the light-exiting surface 11 of the light guide plate 1, i.e., at least the third light-exiting sub-surface of the second light-exiting sub-surface 111, may be depressed inward to form the first concave, as shown in FIG. 1. FIG. 1 merely shows the first concave formed when the third light-exiting sub-surface at the first peripheral region of the light guide plate 1 is depressed inward.

In some embodiments of the present disclosure, apart from the third light-exiting sub-surface, the other parts of the second light-exiting sub-surface 111 may also be depressed inward to form a concave, so as to reduce the thickness of the peripheral region.

In a specific embodiment of the present disclosure, in order to reduce the thickness of the peripheral region of the light guide plate 1, the bottom surface 12 of the light guide plate 1, i.e., at least the third bottom sub-surface of the second bottom sub-surface 121, may be depressed inward to form the second concave, as shown in FIG. 2. FIG. 2 shows a situation where the third bottom sub-surface is depressed inward.

In some embodiments of the present disclosure, apart from the third bottom sub-surface, the other parts of the second bottom sub-surface 121 may also be depressed inward to form a concave, so as to reduce the thickness of the peripheral region.

In a specific embodiment of the present disclosure, in order to reduce the thickness of the peripheral region of the light guide plate 1, the light-exiting surface 11 of the light guide plate 1, i.e., at least the third light-exiting sub-surface of the second light-exiting sub-surface 111, may be depressed inward to form the first concave, and the bottom surface 12 of the light guide plate 1, i.e., at least the third bottom sub-surface of the second bottom sub-surface 121, may be depressed inward to form the second concave, as shown in FIG. 3. FIG. 3 shows the first concave formed when the third light-exiting sub-surface is depressed inward and the second concave formed when the third bottom sub-surface is depressed inward.

In some embodiments of the present disclosure, apart from the third light-exiting sub-surface, the other parts of the second light-exiting sub-surface 111 may also be depressed inward to form a concave, and apart from the third bottom sub-surface, the other parts of the second bottom sub-surface 121 may also be depressed inward to form a concave, so as to reduce the thickness of the peripheral region.

In the embodiments of the present disclosures, a step-like structure may be formed between the first light-exiting sub-surface 110 and the second light-exiting sub-surface 111 forming the first concave; or a slope structure may be formed at a joint between the first light-exiting sub-surface 110 and the second light-exiting sub-surface 111 forming the first concave; or a smooth transition member may be formed at the joint between the first light-exiting sub-surface 110 and the second light-exiting sub-surface 111 forming the first concave.

In actual use, the step-like structure, the slope structure or an arc-like structure may serve as a transition member between a thinned region and a non-thinned region, i.e., between the second light-exiting sub-surface 111 in which at least the third light-exiting sub-surface has been depressed inward to form the first concave and the first light-exiting sub-surface 110. The above are merely several implementation modes, and the present disclosure shall not be limited thereto. In other words, a plane structure, an oblique-surface structure or an arc-surface structure may also be used at the joint between the first light-exiting sub-surface 110 and the second light-exiting sub-surface 111.

In the embodiments of the present disclosure, a step-like structure may be formed between the first bottom sub-surface 120 and the second bottom sub-surface 121 forming the second concave; or a slope structure may be formed at a joint between the first bottom sub-surface 120 and the second bottom sub-surface 121 forming the second concave; or a smooth transition member may be formed at the joint between the first bottom sub-surface 120 and the second bottom sub-surface 121 forming the second concave.

In actual use, the step-like structure, the slope structure or an arc-like structure may serve as a transition member between a thinned region and a non-thinned region, i.e., between the second bottom sub-surface 121 in which at least the third bottom sub-surface has been depressed inward to form the second concave and the first bottom sub-surface 120. The above are merely several implementation modes, and the present disclosure shall not be limited thereto. In other words, a plane structure, an oblique-surface structure or an arc-surface structure may also be used at the joint between the first bottom sub-surface 120 and the second bottom sub-surface 121.

The present disclosure further provides in some embodiments a backlight module, which includes a back plate 2 and the above-mentioned light guide plate 1. The back plate 2 includes a U-like structure consisting of a first portion 21 arranged at the bottom surface 12, a second portion 22 surrounding the light guide plate 1, and a third portion 23 arranged at the light-exiting surface 11 of the light guide plate 1, and the U-like structure encloses the first peripheral region.

At least the first peripheral region of the peripheral region may have a thickness smaller than the central region, so as to at least reduce a height of a cavity of the U-like structure of the back plate 2, thereby to reduce a thickness of the entire backlight module.

A specific structure of the back plate 2 may depend on a specific structure of the light guide plate 1, and several implementation modes will be specifically described hereinafter.

In a first implementation mode, the light-exiting surface 11 may include a first light-exiting sub-surface 110 arranged at the central region and a second light-exiting sub-surface 111 arranged at the peripheral region, and the second light-exiting sub-surface 111 may include a third light-exiting sub-surface. The bottom surface 12 may include a first bottom sub-surface 120 arranged at the central region and a second bottom sub-surface 121 arranged at the peripheral region, and the second bottom sub-surface 121 may include a third bottom sub-surface arranged at the first peripheral region. At least the third light-exiting sub-surface of the second light-exiting sub-surface 111 may be depressed inward to form a first concave, and the third portion 23 may be received in the first concave.

Figure 4:
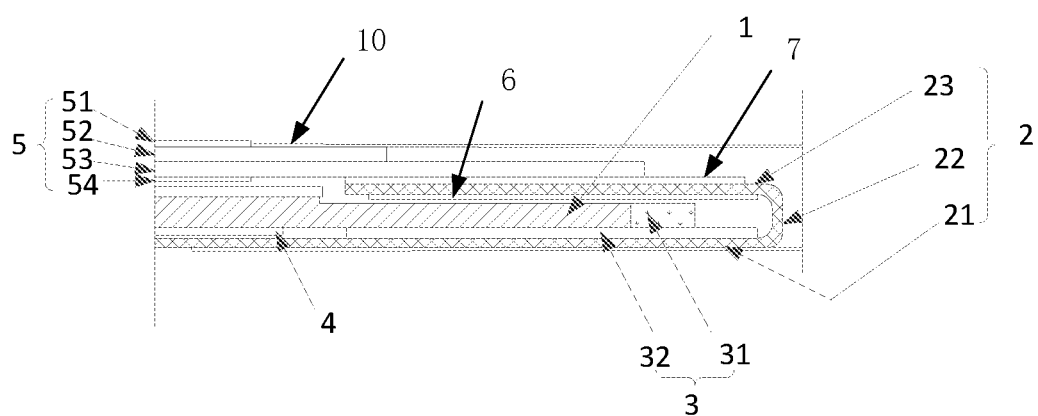
FIG. 4 is a first schematic view of a backlight module according to one embodiment of the present disclosure.

When at least the third light-exiting sub-surface of the second light-exiting sub-surface 111 is depressed inward to form the first concave, the third portion 23 of the back plate 2 may be received in the first concave. As compared with the light guide plate 1 where the central region has a same thickness as the peripheral region, due to the first concave, the height of the U-like cavity of the back plate 2 may be reduced, i.e., a distance between the first portion 21 and the third portion 23 may be reduced obviously, so it is able to reduce the thickness of the entire backlight module, as shown in FIG. 4.

Figure 5:
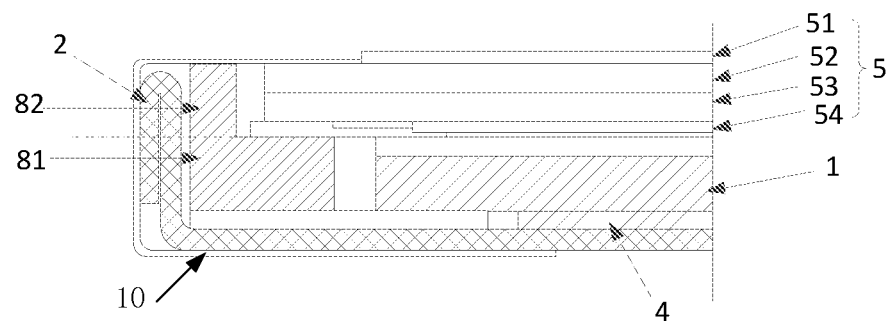
FIG. 5 is a second schematic view of the backlight module according to one embodiment of the present disclosure.

In the first implementation mode, apart from the third light-exiting sub-surface, the other part of the second light-exiting sub-surface 111 may also be depressed inward according to the practical need so as to form a concave, or may remain unchanged, i.e., the second light-exiting sub-surface 111 may be located in a same plane as the first light-exiting sub-surface 110. FIG. 5 is a partial schematic view of the peripheral region of the light guide plate 1 other than the first peripheral region. In FIG. 5, a part of the light-exiting surface 11 of the light guide plate 1 is of a plane structure, i.e., a part of the second light-exiting sub-surface 111 is located in a same plane as the first light-exiting sub-surface 110, and the thickness of the peripheral region of the light guide plate 1 in FIG. 5 other than the first peripheral region is not reduced.

In a second implementation mode, different from the first implementation mode, the backlight module may further include a light bar 3 which includes an LED lamp 31 and a flexible circuit board 32. The LED lamp 31 may be arranged at a light-entering side of the light guide plate 1, and the flexible circuit board 32 may be arranged between the third portion 23 and the third light-exiting sub-surface.

The LED lamp 31 and the flexible circuit board 32 may be arranged sequentially in the second direction (the direction in which the light exits the light guide plate 1), or arranged sequentially in a direction opposite to the second direction. In this implementation mode, the flexible circuit board 32 may be arranged between the third portion 23 and the third light-exiting sub-surface, i.e., it may be received in the first concave. At this time, in order to further reduce the thickness of the backlight module, a difference between the first light-exiting sub-surface 110 and at least a part of the second light-exiting sub-surface 111 forming the first concave may be increased, i.e., the thickness of at least the first peripheral region of the peripheral region of the light guide plate 1 may be further reduced. In this way, it is able to further reduce the height of the cavity of the U-like structure of the back plate 2, thereby to further reduce the thickness of the entire backlight module.

In a third implementation mode, different from the first implementation mode, the backlight module may further include a reflector 4 arranged at a side of the first bottom sub-surface 120 away from the light-exiting surface 11, and the reflector 4 may be arranged at a same layer as the first portion 21.

As compared with a scheme where the reflector 4 is arranged between the light guide plate 1 and the back plate 2, when the reflector 4 is arranged at a same layer as the first portion 21, it is able to further reduce the thickness of the backlight module.

In a fourth implementation mode, different from the third implementation mode, the reflector 4 has a thickness smaller than the first portion 21 in the second direction. The reflector 4 may include a first surface adjacent to the light guide plate 1 and a second surface away from the light guide plate 1, and the first portion 21 may include a third surface adjacent to the light guide plate 1 and a fourth surface away from the light guide plate 1. The second surface and the fourth surface may be located in a same plane, the first surface may be spaced apart from a first position at the light-exiting surface 11 of the light guide plate 1 by a first distance in the second direction, the third surface may be spaced apart from the first position at the light-exiting surface 11 of the light guide plate 1 by a second distance in the second direction, and the first distance may be greater than the second distance.

Figure 9:
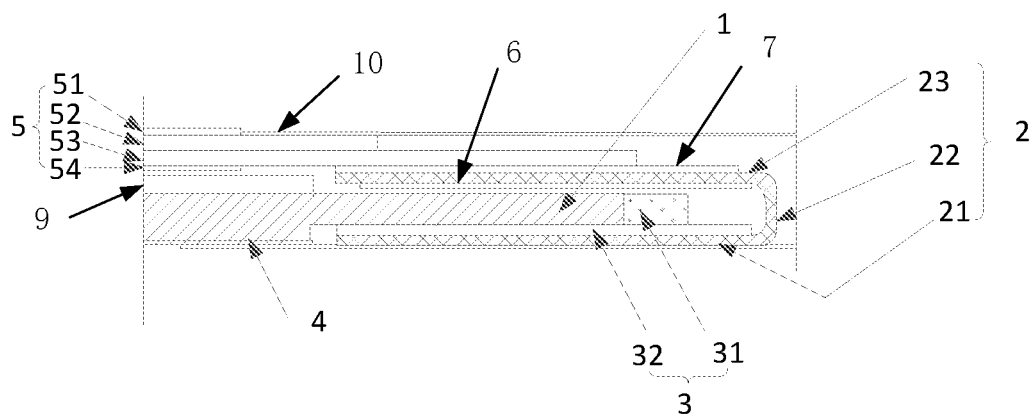
FIG. 9 is a sixth schematic view of the backlight module according to one embodiment of the present disclosure.
Figure 10:
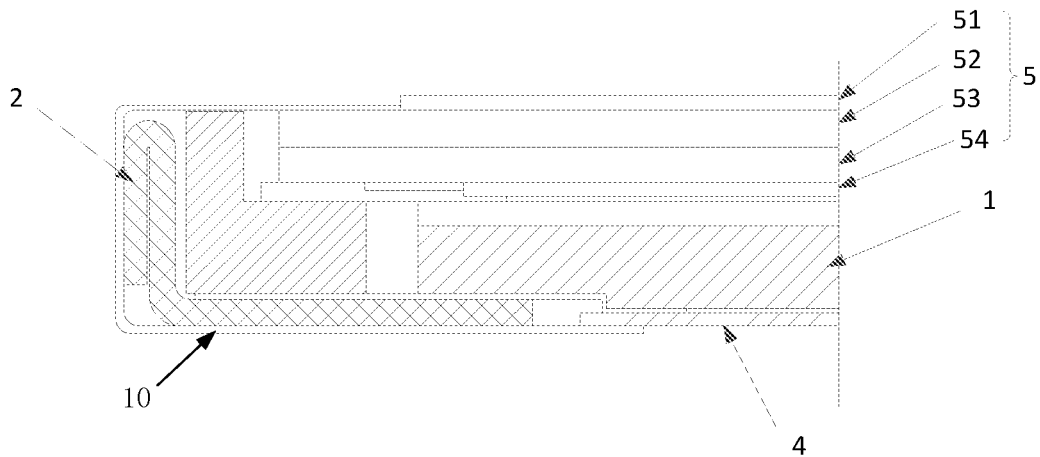
FIG. 10 is a seventh schematic view of the backlight module according to one embodiment of the present disclosure.

The reflector 4 may be arranged at a side of the first bottom sub-surface away from the light-exiting surface 11, so when the thickness of the reflector 4 is reduced, the thickness of the central region of the light guide plate 1 may increase. Although with a difference between the thickness of the central region and the thickness of the peripheral region, this difference is caused when the first bottom sub-surface 120 of the bottom surface at a position corresponding to the central region extends in a direction away from the light-exiting surface 11, rather than being caused by the concave when the peripheral region is depressed inward. An increase in the thickness of the central region may be equivalent to a decrease in the thickness of the reflector 4, so it is able to improve the assembly performance and the strength without increasing the thickness of the entire backlight module, as shown in FIGS. 9 and 10.

In a fifth implementation mode, the light-exiting surface 11 may include a first light-exiting sub-surface 110 arranged at the central region and a second light-exiting sub-surface 111 arranged at the peripheral region, and the second light-exiting sub-surface 111 may include a third light-exiting sub-surface arranged at the first peripheral region. The bottom surface 12 may include a first bottom sub-surface 120 arranged at the central region and a second bottom sub-surface 121 arranged at the peripheral region, and the second bottom sub-surface 121 may include a third bottom sub-surface arranged at the first peripheral region. At least the third bottom sub-surface of the second bottom sub-surface 121 may be depressed inward to form a second concave. The backlight module may further include a light bar 3, the light bar 3 may include an LED lamp 31 and a flexible circuit board 32, the LED lamp 31 may be arranged at a light-entering side of the light guide plate 1, and the flexible circuit board 32 may be received in the second concave.

Figure 6:
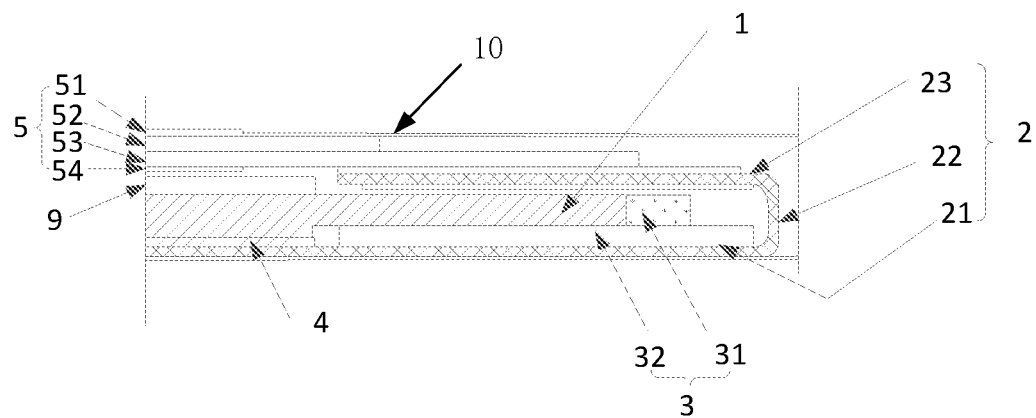
FIG. 6 is a third schematic view of the backlight module according to one embodiment of the present disclosure.

In this implementation mode, at least the third bottom sub-surface of the second bottom sub-surface 121 may be depressed inward to form the second concave, and the flexible circuit board 32 may be received in the second concave, so as to reduce the thickness of the entire display module, as shown in FIG. 6.

In a sixth implementation mode, the light-exiting surface 11 may include a first light-exiting sub-surface 110 arranged at the central region and a second light-exiting sub-surface 111 arranged at the peripheral region, and the second light-exiting sub-surface 111 may include a third light-exiting sub-surface arranged at the first peripheral region. The bottom surface 12 may include a first bottom sub-surface 120 arranged at the central region and a second bottom sub-surface 121 arranged at the peripheral region, and the second bottom sub-surface 121 may include a third bottom sub-surface arranged at the first peripheral region. The backlight module may further include a reflector 4 arranged at a side of the first bottom sub-surface 120 away from the light-exiting surface 11. At least the third bottom sub-surface of the second bottom sub-surface 121 may be depressed inward to form a second concave, the first portion 21 may be received in the second concave, and the reflector 4 may be arranged at a same layer as the first portion 21.

At least the third bottom sub-surface of the second bottom sub-surface 121 may be depressed inward to form the second concave, and the first portion 21 may be received in the second concave, so as to reduce the height of the cavity of the U-like structure of the back plate 2, thereby to reduce the thickness of the entire backlight module. Further, the reflector 4 may be arranged at a same layer as the first portion 21, and as compared with a situation where the reflector 4 is arranged between the back plate 2 and the light guide plate 1, it is able to further reduce the thickness of the entire backlight module.

Figure 7:
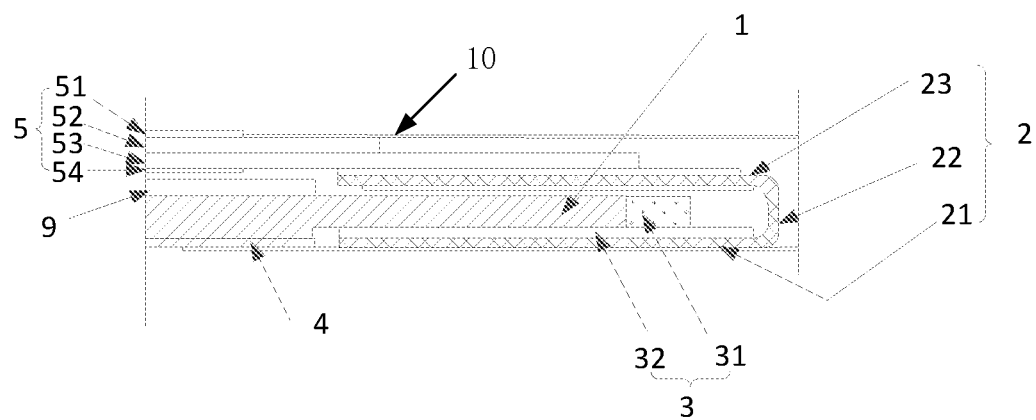
FIG. 7 is a fourth schematic view of the backlight module according to one embodiment of the present disclosure.

It should be appreciated that, the technical features in the fifth implementation mode may be combined with those in the sixth implementation mode, i.e., the flexible circuit board 32 of the light bar 3 may be received in the second concave, and the reflector 4 may be arranged at a same layer as the first portion 21, as shown in FIG. 7.

Figure 8:
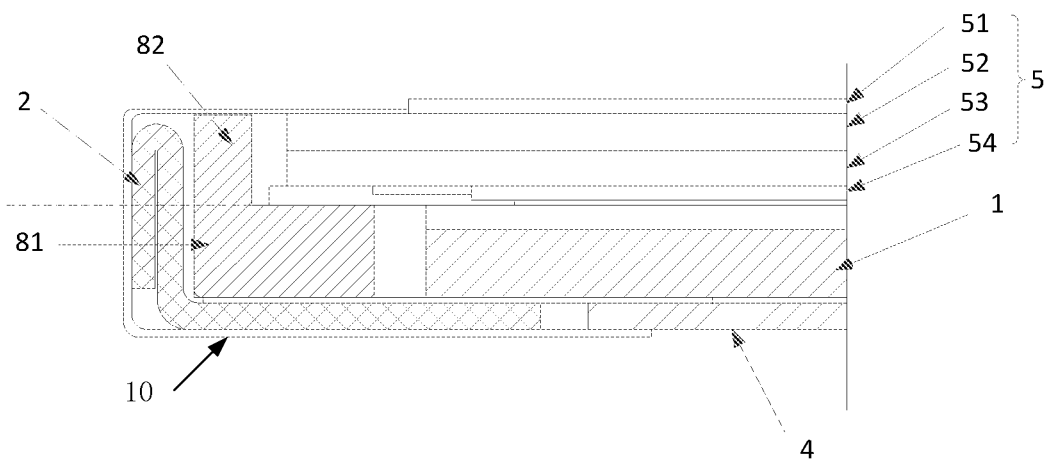
FIG. 8 is a fifth schematic view of the backlight module according to one embodiment of the present disclosure.

In the sixth implementation mode, apart from the third light-exiting sub-surface, the other part of the second light-exiting sub-surface 111 may also be depressed inward according to the practical need so as to form a concave, or may remain unchanged, i.e., the second light-exiting sub-surface 111 may be located in a same plane as the first light-exiting sub-surface 110. Apart from the third bottom sub-surface, the other part of the second bottom sub-surface 121 may also be depressed inward according to the practical need so as to form a concave, or may remain unchanged, i.e., the second bottom sub-surface 121 may be located in a same plane as the first bottom sub-surface 120. FIG. 8 is a partial schematic view of the peripheral region of the light guide plate 1 other than the first peripheral region. In FIG. 8, a part of the light-exiting surface 11 of the light guide plate 1 is of a plane structure, i.e., a part of the second light-exiting sub-surface 111 is located in a same plane as the first light-exiting sub-surface 110. In FIG. 8, a part of the bottom surface 12 of the light guide plate 12 is of a plane structure, i.e., a part of the second bottom sub-surface 121 is located in a same plane as the first bottom sub-surface 120, and the thickness of the peripheral region of the light guide plate 1 in FIG. 8 other than the first peripheral region is not reduced.

It should be appreciated that, in all the implementation modes, apart from the first peripheral region, the thickness of the peripheral region of the light guide plate 1 may remain unchanged, or may be reduced through forming the concave at at least a part of the second light-exiting sub-surface 111 other than the third light-exiting surface and/or forming the concave at at least a part of the second bottom sub-surface 121 other than the third bottom sub-surface, as shown in FIGS. 5 and 8, which will not be particularly defined hereinafter.

In a seventh implementation mode, different from the sixth implementation mode, the reflector 4 may have a thickness smaller than the first portion 21 in the second direction, the reflector 4 may include a first surface adjacent to the light guide plate 1 and a second surface away from the light guide plate 1, and the first portion 21 may include a third surface adjacent to the light guide plate 1 and a fourth surface away from the light guide plate 1. The second surface and the fourth surface may be located in a same plane, the first surface is spaced apart from a first position at the light-exiting surface 11 of the light guide plate 1 by a first distance in the second direction, the third surface may be spaced apart from the first position at the light-exiting surface 11 of the light guide plate 1 by a second distance in the second direction, and the first distance may be greater than the second distance.

The reflector 4 may be arranged at a side of the first bottom sub-surface 120 away from the light-exiting surface 11, so when the thickness of the reflector 4 is reduced, the thickness of the central region of the light guide plate 1 may increase, so as to improve the assembly performance and the strength without increasing the thickness of the entire backlight module, as shown in FIGS. 9 and 10.

In an eighth implementation mode, the light-exiting surface 11 may include a first light-exiting sub-surface 110 arranged at the central region and a second light-exiting sub-surface 111 arranged at the peripheral region, and the second light-exiting sub-surface 111 may include a third light-exiting sub-surface arranged at the first peripheral region. The bottom surface 12 may include a first bottom sub-surface 120 arranged at the central region and a second bottom sub-surface 121 arranged at the peripheral region, and the second bottom sub-surface 121 may include a third bottom sub-surface arranged at the first peripheral region. At least the third light-exiting sub-surface of the second light-exiting sub-surface 111 may be depressed inward to form a first concave, at least the third bottom sub-surface of the second bottom sub-surface 121 may be depressed inward to form a second concave, and the third portion 23 may be received in the first concave.

At least the third light-exiting sub-surface of the second light-exiting sub-surface 111 may be depressed inward to reduce the thickness thereof, and at least the third bottom sub-surface of the second bottom sub-surface 121 may be depressed inward to reduce the thickness thereof. When the thickness of at least a part of each of the light-exiting surface 11 and the bottom surface 12 at the first peripheral region is reduced, it is able to effectively reduce the thickness of the first peripheral region, i.e., effectively reduce the height of the cavity of the U-like structure of the back plate 2, thereby to effectively reduce the thickness of the backlight module, as shown in FIG. 11.

In a ninth implementation mode, different from the eighth implementation mode, the backlight module may further include a light bar 3, the light bar 3 may include an LED lamp 31 and a flexible circuit board 32, the LED lamp 31 may be arranged at a light-entering side of the light guide plate 1, and the flexible circuit board 32 may be received in the first concave or the second concave.

Figure 11:
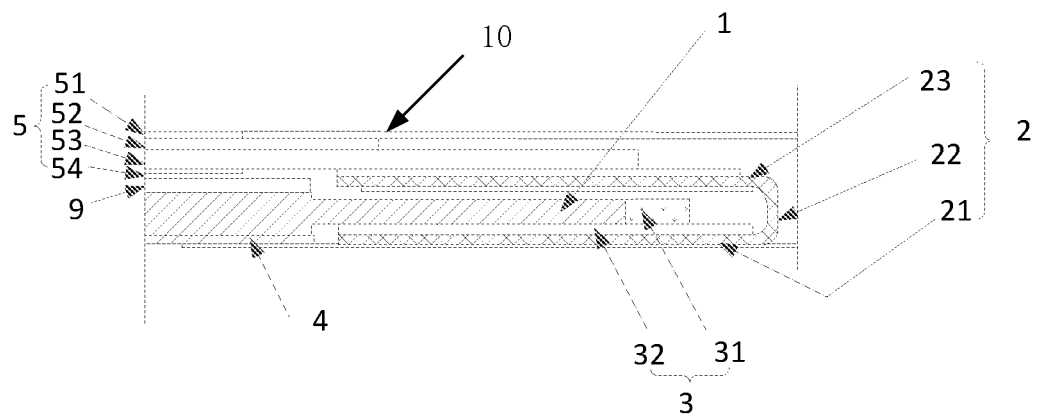
FIG. 11 is an eighth schematic view of the backlight module according to one embodiment of the present disclosure.

FIG. 11 shows that the flexible circuit board 32 is received in the second concave, but the present disclosure shall not be limited thereto. Due to the first concave formed in the light-exiting surface 11 and the second concave formed in the bottom surface 12, no matter whether the flexible circuit board 32 of the light bar 3 is received in the first concave or the second concave, it is able to reduce the thickness of the backlight module.

In a tenth implementation mode, different from the eighth implementation mode, the backlight module may further include a reflector 4 arranged at a side of the first bottom sub-surface 120 away from the light-exiting surface 11, at least the third bottom sub-surface of the second bottom sub-surface 121 may be depressed inward to form a second concave, the first portion 21 may be received in the second concave, and the reflector 4 may be arranged at a same layer as the first portion 21.

A depth of each of the first concave and the second concave in the second direction (i.e., the direction in which the light exits the light guide plate 1) may be set according to the practical need. When the reflector 4 is arranged at a same layer as the first portion 21, it is able to further reduce the thickness of the entire backlight module.

It should be appreciated that, the technical features in the ninth implementation mode may be combined with those in the tenth implementation mode. For example, as shown in FIG. 11, the flexible circuit board 32 of the light bar 3 may be received in the second concave, and the reflector 4 may be arranged at a same layer as the first portion 21.

In an eleventh implementation mode, different form the tenth implementation mode, the reflector 4 may have a thickness smaller than the first portion 21 in the second direction, the reflector 4 may include a first surface adjacent to the light guide plate 1 and a second surface away from the light guide plate 1, and the first portion 21 may include a third surface adjacent to the light guide plate 1 and a fourth surface away from the light guide plate 1. The second surface and the fourth surface may be located in a same plane, the first surface may be spaced apart from a first position at the light-exiting surface 11 of the light guide plate 1 by a first distance in the second direction, the third surface may be spaced apart from the first position at the light-exiting surface 11 of the light guide plate 1 by a second distance in the second direction, and the first distance may be greater than the second distance.

Figure 12:
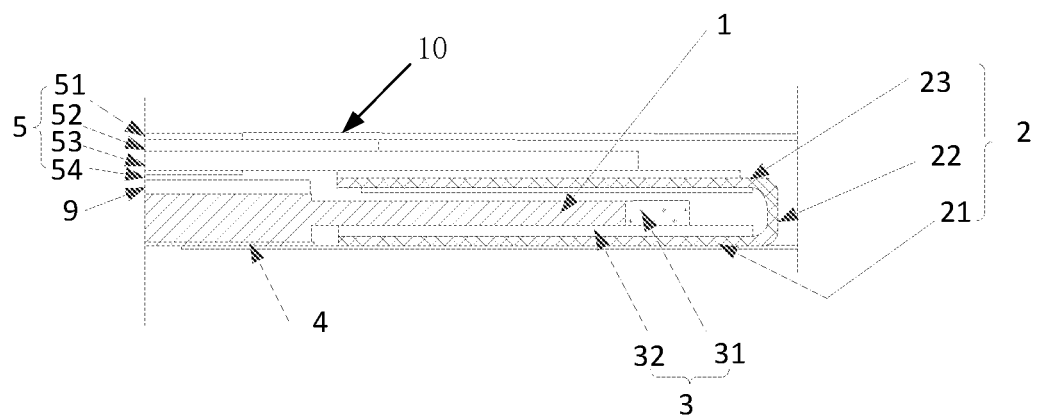
FIG. 12 is a ninth schematic view of the backlight module according to one embodiment of the present disclosure.

The reflector 4 may be arranged at a side of the first bottom sub-surface 120 away from the light-exiting surface 11, so when the thickness of the reflector 4 is reduced, the thickness of the central region of the light guide plate 1 may increase. Although with a difference between the thickness of the central region and the thickness of the peripheral region, this difference is caused when the first bottom sub-surface 120 of the bottom surface at a position corresponding to the central region extends in a direction away from the light-exiting surface 11, rather than being caused by the concave when the peripheral region is depressed inward. An increase in the thickness of the central region may be equivalent to a decrease in the thickness of the reflector 4, so it is able to improve the assembly performance and the strength without increasing the thickness of the entire backlight module, as shown in FIG. 12.

In the embodiments of the present disclosure, a composite prism 9 consisting of a diffusion film and a brightness enhancement film may be arranged at the light-exiting surface 11 of the light guide plate 1.

In the related art, the diffusion film and the brightness enhancement film are arranged independently and laminated one on another at the light-exiting surface 11 of the light guide plate 1. In the embodiments of the present disclosure, the diffusion film and the brightness enhancement film may be integrated to form the composite prism 9 at a side of the first light-exiting sub-surface 110 away from the bottom surface 12. As compared with a situation where the diffusion film and the brightness enhancement film are arranged independently, a thickness of the composite prism 9 may be reduced, so it is able to increase the thickness of the central region of the light guide plate 1, and improve the assembly performance and the strength of the light guide plate 1 without increasing the thickness of the entire backlight module.

In the embodiments of the present disclosure, no matter whether the flexible circuit board 32 of the light bar 3 is received in the first concave or the second concave, a reflection layer 6 may be arranged between the third portion 23 of the back plate 2 and the light guide plate 1, so as to prevent the light leakage, as shown in FIGS. 4 to 12.

The present disclosure further provides in some embodiments a display device, which includes a display panel 5 and the above-mentioned backlight module.

The display panel 5 includes a first substrate 52 and a second substrate 53 arranged opposite to each other. The second substrate 53 is arranged adjacent to the light guide plate 1, a first polarizer 51 is arranged at a side of the first substrate 52 away from the second substrate 53, and a second polarizer 54 is arranged at a side of the second substrate 53 away from the first substrate 52.

When the thickness of the peripheral region of the light guide plate 1 is reduced, it is able to reduce the height of the U-like cavity of the back plate 2, thereby to reduce a thickness of the entire display device.

In the embodiments of the present disclosure, the third portion 23 of the back plate 2 may be connected to the display panel through a fixation adhesive tape 7. In the implementation mode where the reflector 4 is arranged at a same layer as the first portion 21 of the back plate 2, as compared with a scheme where the reflector 4 is arranged between the back plate 2 and the light guide plate 1, it is able to reduce a thickness of the fixation adhesive tape 7, thereby to further reduce the thickness of the display device.

In the embodiments of the present disclosure, the display device may further include a sealant arranged between the display panel 5 and the backlight module. The sealant may include a first connection member 83 arranged between the third portion 23 of the back plate 2 and the display panel 5, a second connection member 81 arranged between the first portion of the back plate 2 and the display panel, and a third connection member 82 formed through extending a part of the second connection member 81 to a side surface of the display panel 5. The fourth portion of the back plate 2 and the second connection member 81 may be arranged at an end portion of the light guide plate 1 opposite to the light-exiting surface, as shown in FIGS. 5, 8 and 13.

A backlight module with a full sealant has strength greater than a backlight module with a gate-like sealant. Some machines cannot adopt the full sealant due to the limit of the height of the U-like cavity of the back plate 2. In the embodiments of the present disclosure, because the thickness of the peripheral region of the light guide plate 1 is reduced, a distance between the third portion 23 of the back plate 2 and the display panel 5 may increase. As a result, it is able to break the limit and provide the full-sealant display device.

Figure 13:
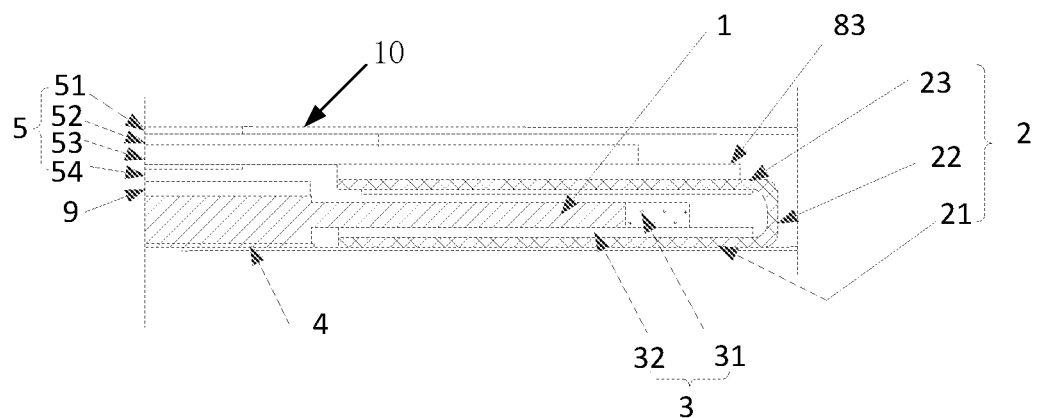
FIG. 13 is a tenth schematic view of the backlight module according to one embodiment of the present disclosure.

FIG. 13 merely shows one implementation mode of the full sealant. It should be appreciated that, in FIGS. 4 to 12, the full sealant may also be provided, i.e., the first connection member 83 of the sealant may be arranged between the third portion 23 of the back plate 2 and the display panel 5.

It should be further appreciated that, after the first connection member 83 of the sealant is arranged between the third portion 23 of the back plate 2 and the display panel 5, in actual use, the composite prism 9 may be provided in accordance with a distance between the display panel 5 and the central region of the light guide plate 1, or the diffusion film and the brightness enhancement film may be arranged independently and laminated one on another to replace the composite prism 9.

In the embodiments of the present disclosure, the display device may further include an encapsulation adhesive tape 10 covering the display panel and the backlight module, as shown in FIGS. 4 to 13. A first region of the encapsulation adhesive tape 10 may be attached to a side of the first substrate 52 away from the second substrate 53, and surround the first polarizer 51.

The display device may be any product or member having a display function, e.g., liquid crystal television, liquid crystal display, digital photo frame, mobile phone or tablet computer. The display device may further include a flexible circuit board, a printed circuit board and a back plate.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A light guide plate, comprising:
a light-entering surface, a light-exiting surface adjacent to the light-entering surface, and a bottom surface arranged opposite to the light-exiting surface,
wherein the light guide plate comprises a central region corresponding to an active display region of a display panel and a peripheral region corresponding a non-display region of the display panel in a first direction, the peripheral region comprises a first peripheral region at a side adjacent to the light-entering surface, at least the first peripheral region of the peripheral region has a thickness smaller than the central region in a second direction,
wherein the first direction is a direction in which light is propagated inside the light guide plate, and the second direction is a direction in which the light exits the light guide plate;
wherein the light-exiting surface comprises a first light-exiting sub-surface arranged at the central region and a second light-exiting sub-surface arranged at the peripheral region, the second light-exiting sub-surface comprises a third light-exiting sub-surface arranged at the first peripheral region,
wherein the bottom surface comprises a first bottom sub-surface arranged at the central region and a second bottom sub-surface arranged at the peripheral region, and the second bottom sub-surface comprises a third bottom sub-surface arranged at the first peripheral region,
wherein at least the third light-exiting sub-surface of the second light-exiting sub-surface is depressed inward to form a first concave, and/or at least the third bottom sub-surface of the second bottom sub-surface is depressed inward to form a second concave, so that at least the first peripheral region of the peripheral region has the thickness smaller than the central region in the second direction.

2. The light guide plate according to claim 1, wherein a step-like structure is formed between the first light-exiting sub-surface and the second light-exiting sub-surface forming the first concave; or
a slope structure is formed at a joint between the first light-exiting sub-surface and the second light-exiting sub-surface forming the first concave; or a smooth transition member is formed at the joint between the first light-exiting sub-surface and the second light-exiting sub-surface forming the first concave.

3. The light guide plate according to claim 1, wherein a step-like structure is formed between the first bottom sub-surface and the second bottom sub-surface forming the second concave; or
a slope structure is formed at a joint between the first bottom sub-surface and the second bottom sub-surface forming the second concave; or
a smooth transition member is formed at the joint between the first bottom sub-surface and the second bottom sub-surface forming the second concave.

4. A backlight module, comprising a back plate and the light guide plate according to claim 1, wherein the back plate comprises a U-like structure consisting of a first portion arranged at the bottom surface, a second portion surrounding the light guide plate, and a third portion arranged at the light-exiting surface of the light guide plate, and the U-like structure encloses the first peripheral region.

5. The backlight module according to claim 4, wherein the light-exiting surface comprises a first light-exiting sub-surface arranged at the central region and a second light-exiting sub-surface arranged at the peripheral region, the second light-exiting sub-surface comprises a third light-exiting sub-surface,
wherein the bottom surface comprises a first bottom sub-surface arranged at the central region and a second bottom sub-surface arranged at the peripheral region, the second bottom sub-surface comprises a third bottom sub-surface arranged at the first peripheral region,
wherein at least the third light-exiting sub-surface of the second light-exiting sub-surface is depressed inward to form a first concave, and the third portion is received in the first concave.

6. The backlight module according to claim 5, further comprising a light bar, wherein the light bar comprises a Light-Emitting Diode (LED) lamp and a flexible circuit board, the LED lamp is arranged at a light-entering side of the light guide plate, and the flexible circuit board is arranged between the third portion and the third light-exiting sub-surface.

7. The backlight module according to claim 5, further comprising a reflector arranged at a side of the first bottom sub-surface away from the light-exiting surface, wherein the reflector is arranged at a same layer as the first portion.

8. The backlight module according to claim 4, wherein the light-exiting surface comprises a first light-exiting sub-surface arranged at the central region and a second light-exiting sub-surface arranged at the peripheral region, the second light-exiting sub-surface comprises a third light-exiting sub-surface arranged at the first peripheral region,
wherein the bottom surface comprises a first bottom sub-surface arranged at the central region and a second bottom sub-surface arranged at the peripheral region, the second bottom sub-surface comprises a third bottom sub-surface arranged at the first peripheral region, and at least the third bottom sub-surface of the second bottom sub-surface is depressed inward to form a second concave,
wherein the backlight module further comprises a light bar, the light bar comprises an LED lamp and a flexible circuit board, the LED lamp is arranged at a light-entering side of the light guide plate, and the flexible circuit board is received in the second concave.

9. The backlight module according to claim 4, wherein the light-exiting surface comprises a first light-exiting sub-surface arranged at the central region and a second light-exiting sub-surface arranged at the peripheral region, the second light-exiting sub-surface comprises a third light-exiting sub-surface arranged at the first peripheral region,
wherein the bottom surface comprises a first bottom sub-surface arranged at the central region and a second bottom sub-surface arranged at the peripheral region, and the second bottom sub-surface comprises a third bottom sub-surface arranged at the first peripheral region,
wherein the backlight module further comprises a reflector arranged at a side of the first bottom sub-surface away from the light-exiting surface, at least the third bottom sub-surface of the second bottom sub-surface is depressed inward to form a second concave, the first portion is received in the second concave, and the reflector is arranged at a same layer as the first portion.

10. The backlight module according to claim 9, wherein the reflector has a thickness smaller than the first portion in the second direction, the reflector comprises a first surface adjacent to the light guide plate and a second surface away from the light guide plate, and the first portion comprises a third surface adjacent to the light guide plate and a fourth surface away from the light guide plate,
wherein the second surface and the fourth surface are located in a same plane, the first surface is spaced apart from a first position at the light-exiting surface of the light guide plate by a first distance in the second direction, the third surface is spaced apart from the first position at the light-exiting surface of the light guide plate by a second distance in the second direction, and the first distance is greater than the second distance.

11. The backlight module according to claim 4, wherein the light-exiting surface comprises a first light-exiting sub-surface arranged at the central region and a second light-exiting sub-surface arranged at the peripheral region, the second light-exiting sub-surface comprises a third light-exiting sub-surface arranged at the first peripheral region,
wherein the bottom surface comprises a first bottom sub-surface arranged at the central region and a second bottom sub-surface arranged at the peripheral region, and the second bottom sub-surface comprises a third bottom sub-surface arranged at the first peripheral region,
wherein at least the third light-exiting sub-surface of the second light-exiting sub-surface is depressed inward to form a first concave, at least the third bottom sub-surface of the second bottom sub-surface is depressed inward to form a second concave, and the third portion is received in the first concave.

12. The backlight module according to claim 11, further comprising a light bar, wherein the light bar comprises an LED lamp and a flexible circuit board, the LED lamp is arranged at a light-entering side of the light guide plate, and the flexible circuit board is received in the first concave or the second concave.

13. The backlight module according to claim 11, further comprising a reflector arranged at a side of the first bottom sub-surface away from the light-exiting surface, wherein at least the third bottom sub-surface of the second bottom sub-surface is depressed inward to form a second concave, the first portion is received in the second concave, and the reflector is arranged at a same layer as the first portion.

14. The backlight module according to claim 13, wherein the reflector has a thickness smaller than the first portion in the second direction, the reflector comprises a first surface adjacent to the light guide plate and a second surface away from the light guide plate, and the first portion comprises a third surface adjacent to the light guide plate and a fourth surface away from the light guide plate, wherein the second surface and the fourth surface are located in a same plane, the first surface is spaced apart from a first position at the light-exiting surface of the light guide plate by a first distance in the second direction, the third surface is spaced apart from the first position at the light-exiting surface of the light guide plate by a second distance in the second direction, and the first distance is greater than the second distance.

15. The backlight module according to claim 4, wherein a composite prism consisting of a diffusion film and a brightness enhancement film is arranged at the light-exiting surface of the light guide plate.

16. A display device, comprising a display panel and a backlight module, wherein the backlight module comprises a back plate and a light guide plate, wherein the light guide plate comprises:
a light-entering surface, a light-exiting surface adjacent to the light-entering surface, and a bottom surface arranged opposite to the light-exiting surface,
wherein the light guide plate comprises a central region corresponding to an active display region of a display panel and a peripheral region corresponding a non-display region of the display panel in a first direction, the peripheral region comprises a first peripheral region at a side adjacent to the light-entering surface, at least the first peripheral region of the peripheral region has a thickness smaller than the central region in a second direction,
wherein the first direction is a direction in which light is propagated inside the light guide plate, and the second direction is a direction in which the light exits the light guide plate;
wherein the light-exiting surface comprises a first light-exiting sub-surface arranged at the central region and a second light-exiting sub-surface arranged at the peripheral region, the second light-exiting sub-surface comprises a third light-exiting sub-surface arranged at the first peripheral region,
wherein the bottom surface comprises a first bottom sub-surface arranged at the central region and a second bottom sub-surface arranged at the peripheral region, and the second bottom sub-surface comprises a third bottom sub-surface arranged at the first peripheral region,
wherein at least the third light-exiting sub-surface of the second light-exiting sub-surface is depressed inward to form a first concave, and/or at least the third bottom sub-surface of the second bottom sub-surface is depressed inward to form a second concave, so that at least the first peripheral region of the peripheral region has the thickness smaller than the central region in the second direction;
wherein the back plate comprises a U-like structure consisting of a first portion arranged at the bottom surface, a second portion surrounding the light guide plate, and a third portion arranged at the light-exiting surface of the light guide plate, and the U-like structure encloses the first peripheral region.

17. The display device according to claim 16, further comprising a sealant arranged between the display panel and the backlight module, wherein the sealant comprises a first connection member arranged between the third portion of the back plate and the display panel, a second connection member arranged between the first portion of the back plate and the display panel, and a third connection member formed through extending a part of the second connection member to a side surface of the display panel.

18. The backlight module according to claim 8, wherein the light-exiting surface comprises a first light-exiting sub-surface arranged at the central region and a second light-exiting sub-surface arranged at the peripheral region, the second light-exiting sub-surface comprises a third light-exiting sub-surface arranged at the first peripheral region, wherein the bottom surface comprises a first bottom sub-surface arranged at the central region and a second bottom sub-surface arranged at the peripheral region, and the second bottom sub-surface comprises a third bottom sub-surface arranged at the first peripheral region,
wherein the backlight module further comprises a reflector arranged at a side of the first bottom sub-surface away from the light-exiting surface, at least the third bottom sub-surface of the second bottom sub-surface is depressed inward to form a second concave, the first portion is received in the second concave, and the reflector is arranged at a same layer as the first portion.

* * * * *